United States Patent [19]

Leib

[11] Patent Number: 5,111,314
[45] Date of Patent: May 5, 1992

[54] OPTICAL CORRELATOR INTERCONNECT FOR OPTICAL COMPUTER

[75] Inventor: Kenneth G. Leib, Wantagh, N.Y.

[73] Assignee: Grumman Aerospace Corporation, Bethpage, N.Y.

[21] Appl. No.: 564,580

[22] Filed: Aug. 9, 1990

[51] Int. Cl.⁵ .................................................. G03H 1/16
[52] U.S. Cl. .................................. 359/29; 359/559; 359/561; 359/563; 382/31; 382/42
[58] Field of Search ................... 350/3.6, 3.81, 3.82, 350/162.12, 162.13, 162.14, 162.15; 364/822, 827; 382/31, 42

[56] References Cited

U.S. PATENT DOCUMENTS

| | | | |
|---|---|---|---|
| 3,779,492 | 12/1973 | Grumet | 244/3.17 |
| 3,785,736 | 1/1974 | Spitz et al. | 350/162.13 |
| 4,869,574 | 9/1989 | Hartman | 364/822 |
| 4,903,314 | 2/1990 | Fine | 350/3.6 |
| 4,941,733 | 7/1990 | Leib | 350/162.12 |

OTHER PUBLICATIONS

Kumar et al, "Multiple Imaging with an Aberration Optimized Hololens Array", *Optical Engineering*, vol. 28, No. 8, pp. 903-908, dated Aug. 1989.
Feldman et al, "Holograms for Optical Interconnects for Very Large Scale Integrated Circuits Fabricated by Electron-Beam Lithography", *Optical Engineering*, vol. 28, No. 8, pp. 915-921, dated Aug. 1989.
Bergman et al, "Holographic Optical Interconnects for VLSI", *Optical Engineering*, vol. 25 No. 10, pp. 1109-1118, dated Oct. 1986.

*Primary Examiner*—Bruce Y. Arnold
*Assistant Examiner*—J. P. Ryan
*Attorney, Agent, or Firm*—Bacon & Thomas

[57] ABSTRACT

Optical correlator technology is applied to optical computing in the form of an optical interconnect utilizing multiple Fourier transforms in a hologram-based design.

8 Claims, 6 Drawing Sheets

OPTICAL CORRELATOR INTERCONNECT FOR OPTICAL COMPUTER

BACKGROUND OF THE INVENTION

1. Field of the Invention

The present invention relates generally to optical correlators and interconnects, and more particularly to the application of optical correlator technology to interconnects in an optical computer.

2. Description of the Related Art

Conventionally, the input to an optical correlator comprises either a film illuminated by a collimated laser beam or a spatial light modulator that modulates a collimated laser beam. Both correlators lack the versatility necessary to perform as an interconnect in an optical computer.

SUMMARY OF THE INVENTION

The chief goal of the present invention is to apply optical correlator technology to an optical computer for the performance of computational functions and to extend optical interconnect capabilities by means of the optical correlator.

The invention accomplishes this goal by utilizing a matched filter of a hologram of a laser beam pattern and a multiple Fourier transformation to achieve diverse combinations of optical interconnect capabilities and all advantages associated with optical interconnects. The optical correlator interconnect comprises a means for providing a coherent light beam or plurality of coherent light beams to a multiple holographic lens, which multiple holographic lens focuses the input light beams on a matched filter formed of the Fourier transformed hologram of the pattern of one input light beam. Outputs from the matched filter are inverse Fourier transformed to a single plane or to individual correlator planes, which planes represent the object of the interconnections and the inputs to subsequent computational and/or processing stages.

Through the use of the invention, optical computations and optical signal transfers are accomplished expediently, since the inputs to the multiple holographic lens may be arranged to represent a binary signal in space and each beam with some temporal modulation, binary or otherwise.

DETAILED DESCRIPTION OF THE PREFERRED EMBODIMENTS

Figure 1:
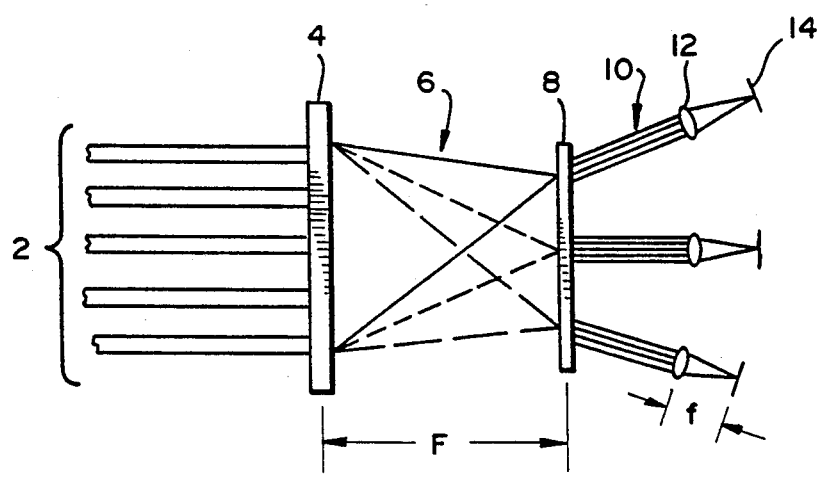
FIG. 1 schematically illustrates a basic embodiment of the inventive optical correlator interconnect.

FIG. 1 illustrates the basic operation of the invention. Optical inputs 2, which preferably comprise spatially-controlled laser beams from, e.g., one of the representative sources shown in FIG. 2 or from a matrix like that shown in FIG. 5, are input to multiple holographic lens 4.

An example of a multiple holographic lens is described in U.S. Pat. No. 3,779,492 to Grumet, which patent is assigned to the present assignee, and is hereby incorporated by reference. Multiple holographic lens 4 is a hologram (preferably made from a point source of light using a step-and-repeat procedure with the recording medium) that is recreated after the medium is processed when collimated light is incident upon it. Multiple holographic lens 4 may be made on one photographic plate or on another recording media.

For descriptive purposes, multiple holographic lens 4 is shown as a 3×1 arrangement in FIG. 1, in which the three focal points of beams 6 output from multiple holographic lens 4 comprise a plane including a corresponding matched filter array 8.

Matched filter 8 is the Fourier transform hologram of a desired "target" image input to multiple holographic lens 4. In an optical interconnect such as the present invention, the input target is a uniform circular spot; in other words, the input target is the cross-section of one light beam that is part of the array of input beams 2.

Figure 3:
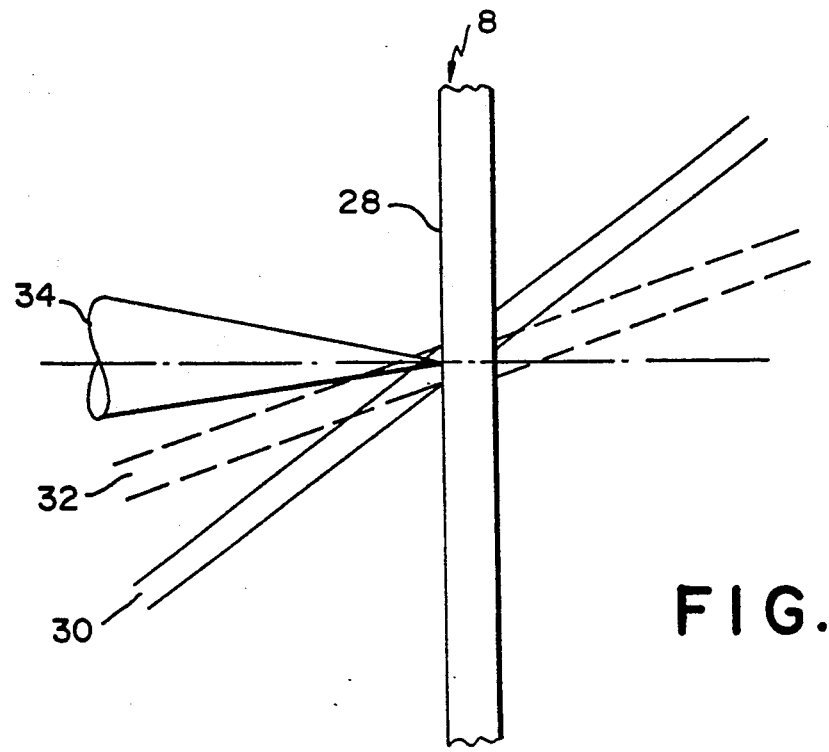
FIG. 3 schematically illustrates the formation of a matched filter.

The Fourier transform of the input target is the Airy disk. When matched filter 8 is made of the input target, a reference beam 30 is brought to the focal plane 28 of target beam 34 as shown in FIG. 3. By this well-known procedure, the hologram of matched filter 8 (often called a Fourier transform hologram) is formed. Reference beam 30 can be brought in at any desired angle to produce an output image "viewable" from that angle. A second, dotted line reference beam 32 is shown for comparison. The aforementioned Grumet patent fully describes the operation of a matched filter.

The light beams 10 that transmit through matched filter 8 are focussed on one or more individual correlation planes 14 by separate inverse Fourier transform lenses 12. Output beams 10 may be variously directed by using a plurality of reference beam angles during fabrication of the matched filter holograms. Thus, the output for an optical interconnect can be independent channels or sections of a whole in a common plane output. The object to which interconnection is made determines the configuration.

Figure 2A:
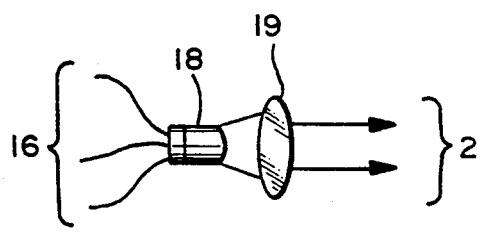
FIG. 2a is one example of an input source that may be used in the practice of the invention.

The source shown in FIG. 2a is a laser diode 18 arranged to output coherent light to multiple holographic lens 4 via an appropriate collimating lens 19. Laser diode 18 receives its on-off signals via leads 16 from a prior stage in, e.g., an optical computer. In this and subsequent renditions, the collimating lens is shown as a simple lens, whereas it preferably represents a more complex arrangement to modify a nonround output from such laser diodes to a round beam similar to that used in fabricating the matched filter.

Figure 2B:
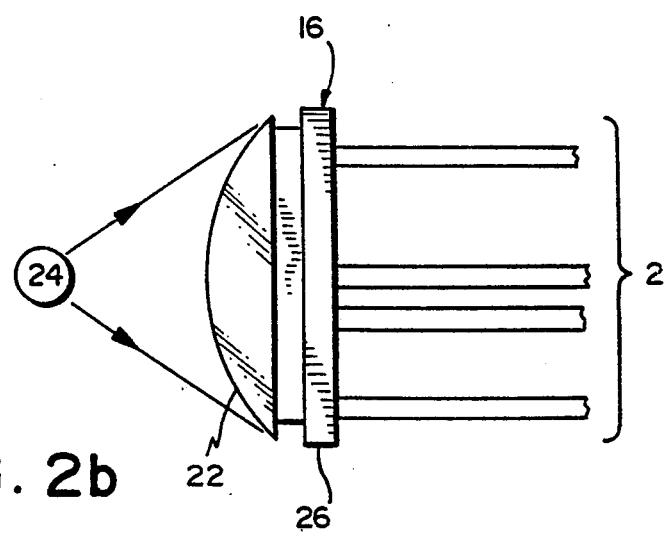
FIG. 2b shows a second possible input source means useful in the practice of the invention.

An alternative source is shown in FIG. 2b where a single laser source 24 transmits coherent light via collimating lens 22 and a preferably electrooptic switch array 26 to multiple holographic lens 4. Inputs 16 to electrooptic switch array 26 provide a selectable array of beams 2 to be passed according to some predetermined optical computer interconnect requirement.

Figure 4:
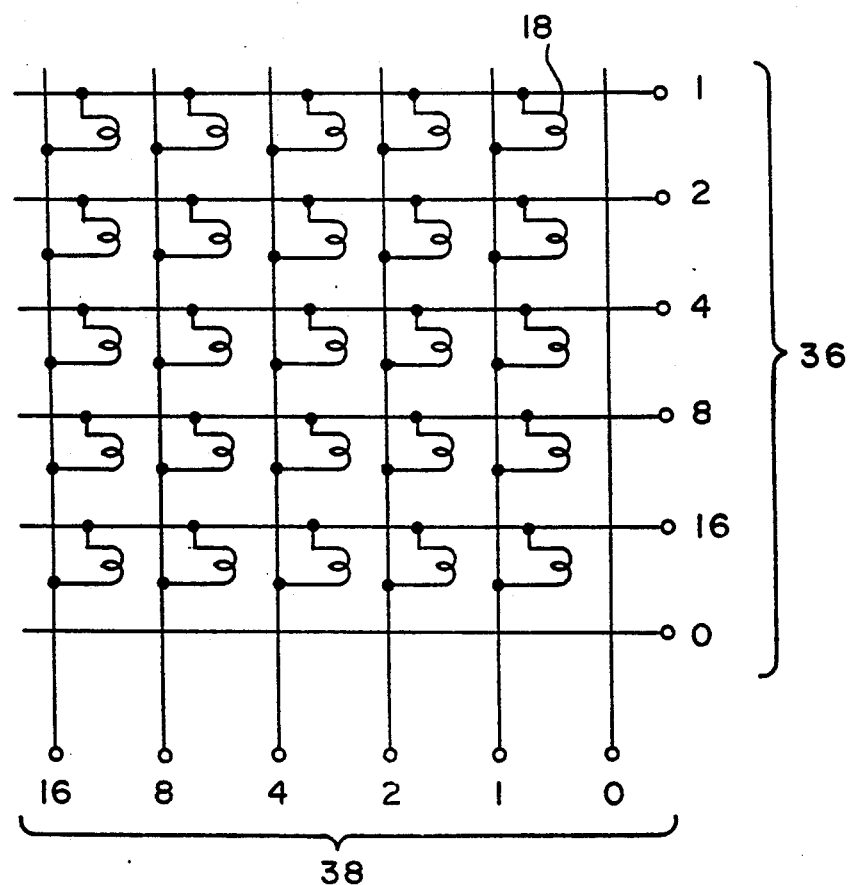
FIG. 4 illustrates a preferred matrix configuration for the input source of the invention.

In an optical computer, the preferred inputs 2 shown in FIG. 1 may be provided by a plurality of laser diodes, illustratively arranged in a matrix configuration as shown in FIG. 4. Each laser diode 18 is connected to a horizontal drive signal 36 and a vertical drive signal 38. The optics necessary to collimate and provide circular beams are not shown but are similar to those previously described. The horizontal and vertical drive signals represent preferred methods of obtaining binary inputs (illustratively, 5-bit inputs) for encoding the input beams 2 in a binary fashion to correspond to a desired interconnect pattern. One of ordinary skill in the art will recognize that other methods of inputting binary signals to multiple holographic lens 4 are possible.

Figure 5A:
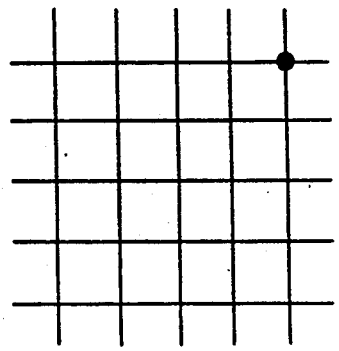
FIG. 5a illustrates the matrix output of binary 10000 looking toward the source, with the same binary number input in x and y.
Figure 5B:
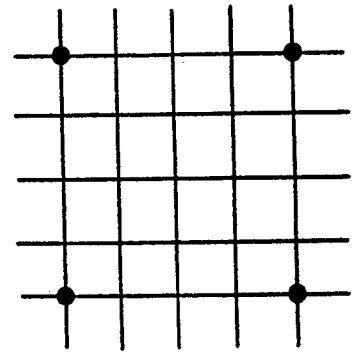
FIG. 5b illustrates the matrix output of binary 10001.

As a simple example of beam encoding, suppose binary 1 (represented by 10000 from top to bottom in the 5-bit array shown) is applied to both horizontal and vertical inputs. The labeled laser diode 18 is activated, and no other, as shown in FIG. 5a. According to the invention, the output of labeled laser diode 18 is collimated and constitutes a one-beam input to the multiple holographic lens 4 of FIG. 1. If decimal 17 (binary 10001) is applied to both horizontal and vertical inputs, the matrix pattern shown in FIG. 5b results. Of course, different binary inputs may be applied to x and y.

Figure 6A:
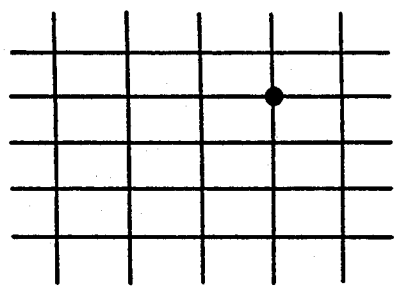
FIG. 6a illustrates the matrix output of binary 01000.
Figure 6B:
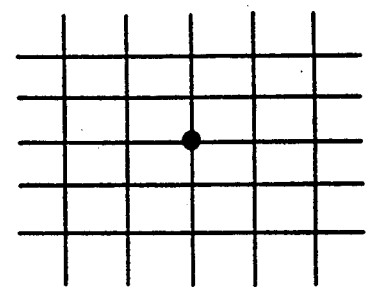
FIG. 6b illustrates the matrix output of binary 00100.

One illustration of the utility of the invention is the speed at which a binary input can be doubled. Taking the binary 10000 previously illustrated in FIG. 5a, to double the number, decimal 2 (binary 01000) is applied to each of the horizontal and vertical inputs. Doubling again, decimal 4 (binary 00100) is applied to each input. The results are shown in FIGS. 6a and 6b.

When compared to FIG. 5a, one can see that doubling results in a diagonal shift of the output pattern, down and to the left. The same result occurs when doubling any binary number using the matrix input. Doubling, therefore, can be carried out by a mere pattern shift, which can provide a major change in optical connection.

Figure 7:
FIG. 7 illustrates the relatively large read signal and low surrounding noise signal resulting from a scan of binary 00100 exhibited and measured in the correlation plane.

In a specific embodiment that has been tested, a matched filter was made from the center hole of the square array of nine holes, a diagonal of the array being equal to approximately 0.0995 inches. Upon illumination to simulate an array of collimated semiconductor lasers, the center hole was opened to represent binary 00100 as applied to both x- and y- axes of the cross bar matrix. The output image was then captured by a frame grabber board in a personal computer, a scan being made across the pattern with the result shown in FIG. 7. While the y-direction intensity may not be maximum absent many trials, the figure demonstrates the relatively low intensity of surrounding laser signal, which is important because extraneous signal acts as cross talk, and would constitute interference when similar output signals are packed closely together in an optical computer environment. With baseline subtraction, however, noise signals in this environment can be eliminated.

Figure 8A:
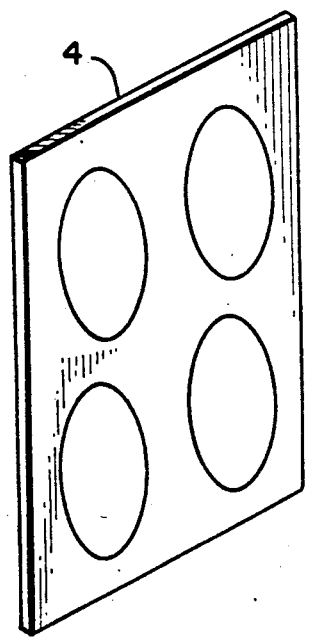
FIG. 8a shows a fly's-eye lens form that the multiple holographic lens of the invention may take.
Figure 8B:
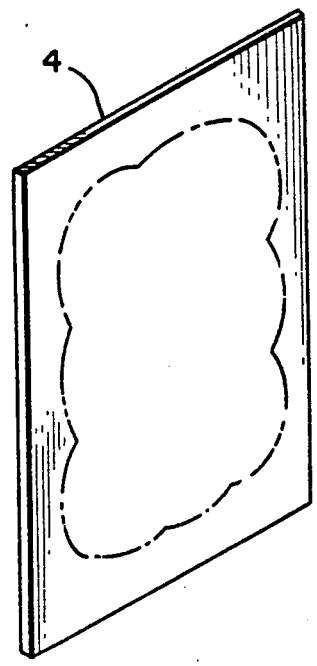
FIG. 8b shows an overlapping, multiple lens structure that may comprise the multiple holographic lens of the invention.

Various embodiments of multiple holographic lens 4 are possible. For example, multiple holographic lens 4 may take the form of an array of "fly's-eye" lenses, or it may comprise a multiple, overlapping set of lenses in some preset array. These two forms are shown, respectively, in FIGS. 8a and 8b. An array of the latter in which each fly's-eye lens is a multiple holographic lens is also a possible arrangement. The multiple holographic lens is the preferred embodiment. When the fly's eye lens is used, it should be perceived that each channel is independent.

FIG. 9 illustrates three arbitrary types of holograms, and serves to show how the output of a hologram can be made to depend upon such factors as hologram material index of refraction, wavelength of input light, thickness of the holographic recording material, and holographic fringe separation (which in turn depends upon wavelength and angle between interfering beams).

Figure 9A:
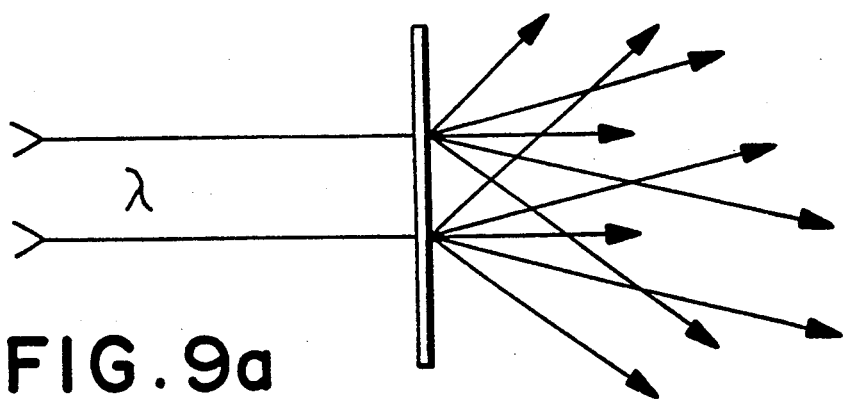
FIG. 9a illustrates the output of an illuminated hologram, including a primary beam along with a plurality of side order beams, from a relatively thin hologram recording medium.
Figure 9B:
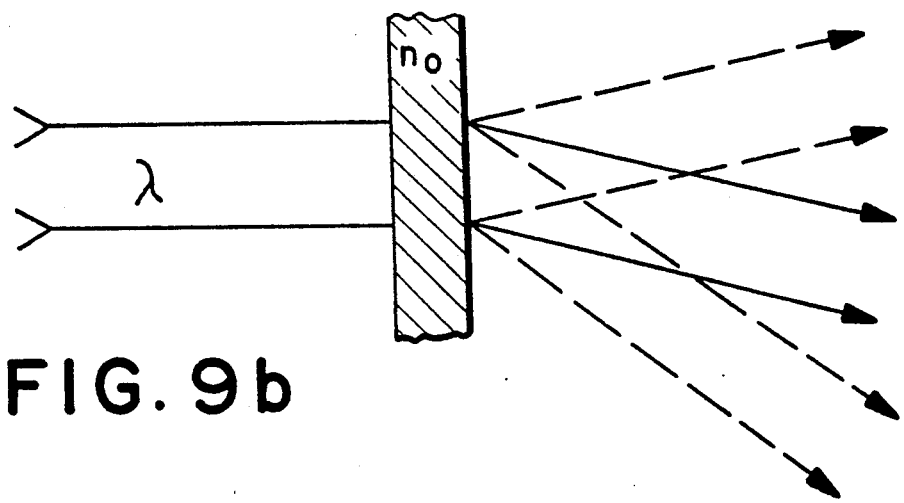
FIG. 9b illustrates the effect that increasing the thickness of the hologram material has on the output beams.
Figure 9C:
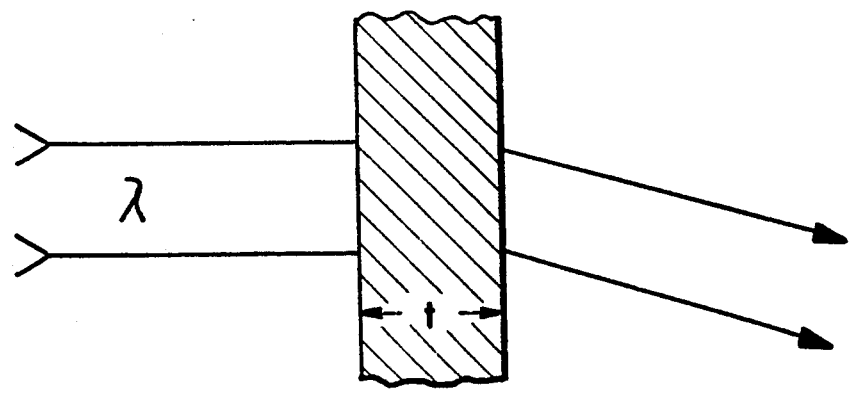
FIG. 9c illustrates a possible effect of an optical maximum in the thickness of the hologram recording material on the hologram output.

FIG. 9a shows how the output of an illuminated hologram yields a primary beam along with many side order beams. FIG. 9b shows, illustratively, the effect of changing material index of refraction, which reduces side order beams. FIG. 9c shows that changing the thickness of the holographic recording material and the holographic fringe separation can result in a single diffracted beam output, with high efficiency and negligible side order beams. One of ordinary skill in the art familiar with the fabrication and operation of holographic lenses will readily know that these and other outputs are generally predictable and constructable once the geometric and material properties are ascertained.

According to the invention, therefore, different reference beam angles may be desirable where correlation planes 14 are required at different locations. For example, the design of an optical computer incorporating the invention dictates where the correlation planes are needed by where the output strands of the interconnect must be in order to form the optical inputs to a subsequent interconnect or processing stage, for example. Since each matched filter output 10 proceeds along its respective reference beam, as for any hologram output, different reference beam angles may be important.

Therefore, a matched filter of a single target has the same number of outputs 10 regardless of the number of circular patterns that form the target. For example, if 100 beams 6 are input to matched filter 8, there will be 100 foci at each correlation plane 14. The diameter of each focus is given by the ratio f/F, where f equals the focal length of inverse Fourier transform lens 16 and F is the focal length of multiple holographic lens 4. If matched filter 8 comprises an array of 49 matched filters, for example, then the same 100 input beams 6 will be replicated 49 times, producing 4,900 output beams 10.

Figure 10A:
FIG. 10a illustrates the output plane of the matched filter upon input of a single light beam.
Figure 10B:
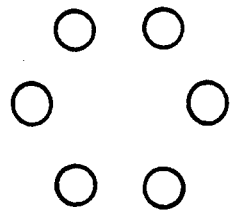
FIG. 10b illustrates one possible matched filter output given a six-beam input pattern.

Similarly, the arrangement of outputs 10 focussed at each correlator plane 14 depends upon the arrangement of beams 6 input to matched filter 8. As shown in FIG. 10a, if one matched filter comprises the matched filter array, and a single light beam input is present, each output plane would appear like that shown. If a regular pattern of six light beams is input to match filter 8, then the pattern shown in FIG. 10b would be present at each output plane, given a single matched filter. Any number of output patterns are thus possible using the invention.

It should be noted that the optical patterns, no matter how many, are transferred at almost the speed of light, being slowed down only by the glass members present.

Figure 11:
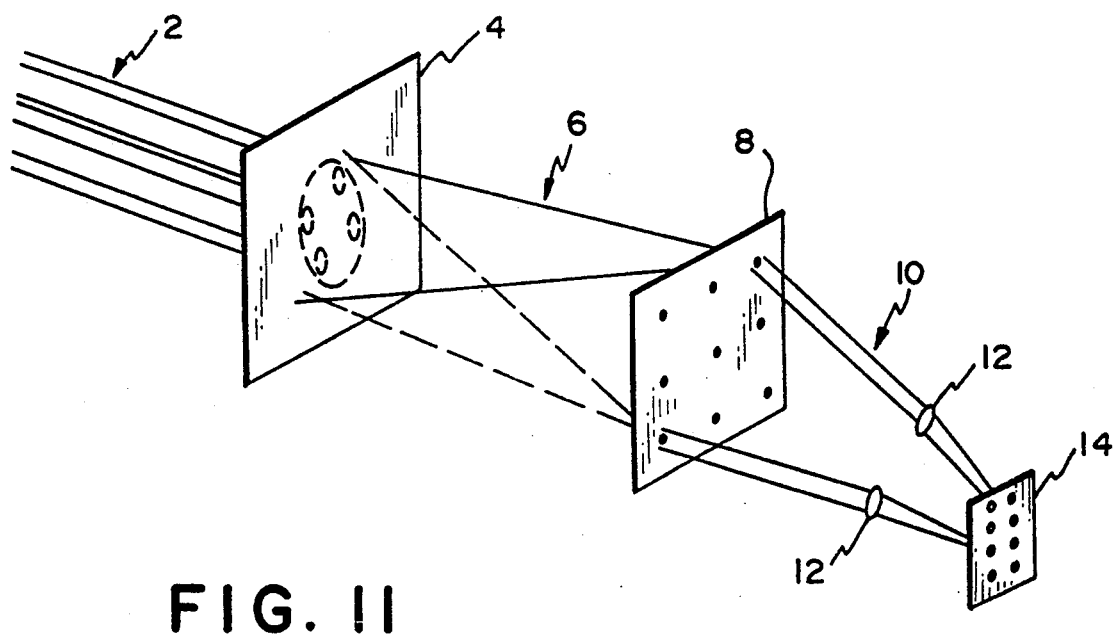
FIG. 11 shows how individual outputs of the matched filter may be directed at different angles as desired.

The invention may also be utilized to arrange the individual matched filter outputs as desired. As illustrated in FIG. 11, individual outputs 10 of matched filter 8 may be directed at different angles so that inverse transform lenses 12 bring the matched filter outputs 10 to be focussed one above another as shown. In this manner, four inputs 6 may be directed to address eight outputs 10. Inputs may also be directed to separate planes, as shown in FIG. 1. The combinations of inputs and outputs are thus quite versatile, although not practically boundless.

Various modifications of the invention will become readily apparent to one of skill in the art. All such modifications that basically rely upon the teachings disclosed in the specification are properly considered within the spirit and scope of the invention.

I claim:

1. An optical correlator interconnect for an optical computer, comprising:
   light beam source means including an array of light sources for forming a selected number of input beams in response to a binary input signal;
   optical correlator means including holographic lens means for receiving, at a first plane, said input beams from said selected light sources and outputting a selected number of frequency correlated output beams having a predetermined size and shape, said optical correlator means further including a matched filter of fixed size and shape; and
   inverse Fourier transform means for receiving said frequency-correlated output beams and focusing each of said correlated output beams on a respective second plane.

2. An optical correlator interconnect as claimed in claim 1, wherein said output beam is circular.

3. An optical correlator interconnect as claimed in claim 2, wherein said matched filter means comprises the Fourier transform hologram of at least one of said input light beams.

4. An optical correlator interconnect as claimed in claim 1, wherein said holographic lens means further comprises:
   a multiple holographic lens for directing each of said selected number of input light beams onto said matched filter.

5. An optical correlator interconnect as claimed in claim 1, wherein each said respective second plane comprises an input to a subsequent stage of an optical computer.

6. An optical correlator interconnect as claimed in claim 1, wherein said binary input comprises means for applying pairs of specified voltages at right angles to said array of light sources to activate selected ones of said light sources.

7. An optical correlator interconnect as claimed in claim 1, wherein said light beam source means comprises means for temporarily modulating any number of said light sources with an optical binary signal.

8. An optical correlator interconnect as claimed in claim 1, wherein said light beam source means is arranged to provide a plurality of light beams, and wherein said holographic lens means comprises means for simultaneously Fourier transforming said plurality of input light beams at said first plane.

* * * * *